US008672303B2

(12) United States Patent
Akagawa et al.

(10) Patent No.: US 8,672,303 B2
(45) Date of Patent: Mar. 18, 2014

(54) BUSH FOR ISOLATING STABILIZER FROM VIBRATION

(75) Inventors: Taiji Akagawa, Wako (JP); Haruo Hashimoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 221 days.

(21) Appl. No.: 13/144,430

(22) PCT Filed: Dec. 22, 2009

(86) PCT No.: PCT/JP2009/071317
§ 371 (c)(1),
(2), (4) Date: Jul. 13, 2011

(87) PCT Pub. No.: WO2010/082434
PCT Pub. Date: Jul. 22, 2010

(65) Prior Publication Data
US 2011/0272870 A1 Nov. 10, 2011

(30) Foreign Application Priority Data

Jan. 14, 2009 (JP) ................................. 2009-005815

(51) Int. Cl.
*F16F 5/00* (2006.01)
*F16M 1/00* (2006.01)
(52) U.S. Cl.
USPC .................. 267/140.11; 267/141; 267/292
(58) Field of Classification Search
USPC ................... 267/136, 140.11, 141, 292, 293;
280/124.121, 124.144, 124.169
See application file for complete search history.

(56) References Cited

U.S. PATENT DOCUMENTS

| 4,623,164 A | * | 11/1986 | Cassel et al. | ........... 280/124.106 |
| 4,750,757 A | | 6/1988 | Long | |
| 4,951,962 A | | 8/1990 | Tomida et al. | |
| 5,743,987 A | * | 4/1998 | Tang et al. | ............... 156/244.11 |

FOREIGN PATENT DOCUMENTS

| DE | 1 980 5463 A1 | 8/1999 |
| JP | S63-14407 U | 1/1988 |
| JP | 2003-136931 A | 5/2003 |

* cited by examiner

*Primary Examiner* — Melody Burch
(74) *Attorney, Agent, or Firm* — Carrier Blackman & Associates, P.C.; William D. Blackman; Michael J. McCandlish

(57) ABSTRACT

A bush for isolating a stabilizer from vibration, is adapted to be fitted from the open end of an axle beam having a substantially U-shaped cross-section, to a stabilizer bar passing through the inside of the axle beam. The bush includes a fitting hole and an opening for guiding the bar into the fitting hole. The opening has a pair of first projections facing each other and a pair of second projections facing each other. When the opening becomes engaged with the bar, the first and second projections sequentially and individually contact with the bar and elastically deform in the direction in which the opening opens. When the fitting hole has engaged with the bar, the bush makes contact with the inner surface of the beam and elastically deforms in the direction in which the opening closes, and this causes the second projections to make contact with the first projections 7 Claims, 8 Drawing Sheets

BUSH FOR ISOLATING STABILIZER FROM VIBRATION

TECHNICAL FIELD

The present invention relates to a bush adapted to be attached to a stabilizer bar in a vehicle suspension, for isolating a stabilizer from vibration.

BACKGROUND ART

In, for example, a rear suspension, there are structures in which the rear wheels are mounted on both ends of an axle beam which is long and narrow in the width direction of the vehicle, and a stabilizer bar bridges both ends of the axle beam. The cross-sectional shape of the axle beam is U-shaped. The stabilizer bar, which is a torsion bar, is arranged inside the axle beam.

While a vehicle is traveling and when the brakes are applied, the axle beam and stabilizer bar are subjected to some vibration. In order to suppress this vibration, an anti-vibration bush is fitted partway along the length of the axle beam. This technology is disclosed in Patent Document 1. Because the anti-vibration bush is fitted onto the stabilizer bar, it is known as a bush for isolating a stabilizer from vibration.

The bush for isolating a stabilizer from vibration disclosed in Patent Document 1 is an elastic element formed with a substantially C-shaped cross-section. This bush is introduced from the open end of an axle beam having a U-shaped cross-section, and fitted over the stabilizer bar. The outer peripheral surface of the fitted bush comes into contact with the inner surface of the axle beam in a compressed state. Vibration of the axle beam and the stabilizer bar is suppressed by the bush.

In order to fit a bush formed with a substantially C-shaped cross-section over a stabilizer bar, the opening in the bush has to be opened widely. Thus, a greater degree of flexibility allows the bush to be attached more securely on the axle beam and stabilizer bar. However, vibration must not cause an attached bush to come off the axle beam and stabilizer bar. Thus, the elastic element serving as the bush is preferably relatively hard.

PRIOR ART DOCUMENTS

Patent Documents

Patent Document 1; Japanese Patent Application Laid-Open Publication No. 2003-136931

SUMMARY OF INVENTION

Technical Problem

An object of the present invention is to provide a technique allowing a bush for isolating a stabilizer from vibration to be more securely attached on an axle beam and stabilizer bar while also more effectively preventing the bush from coming off the axle beam and stabilizer bar.

Solution to Problem

According to the present invention, there is provided a stabilizer-vibration-isolating bush for isolating a stabilizer in a vehicle suspension from vibration, the bush being adapted to be inserted from an open end of an axle beam having a substantially U-shaped cross-section and extending in a vehicle width direction and to be engaged with a stabilizer bar passing through inside the axle beam, wherein the bush comprises a tubular elastic element which has an opening for engaging with the stabilizer bar and a fitting hole being in communication with the opening and adapted to be fitted over the stabilizer bar, characterized in that: the opening has a pair of first projections and a pair of second projections in a range from the fitting hole to an open end of the opening;

the first projections are positioned adjacent to the fitting hole and face each other; the second projections are positioned adjacent to the open end of the opening and face each other; the second projections and the first projections are formed so as to make sequential and individual contact with the stabilizer bar and so as to be individually capable of elastically deforming in a direction of opening of the opening as the opening engages with the stabilizer bar; and the elastic element is formed so as to make contact with a substantially U-shaped inner surface of the axle beam and elastically deform in a direction of closing of the opening, and thereby be capable of elastically deforming the second projections until the projections contact the first projections, when the fitting hole is fitted over the stabilizer bar.

Preferably, an opening width between the second projections is greater than an opening width between the first projections.

Desirably, each of the second projections has an inclined surface facing the open end of the opening, and the inclined surfaces are formed so as to move closer to each other while moving from the open end to the fitting hole.

In a preferred form, the first projections and the second projections are provided by a pair of grooves being formed in a pair of mutually opposing opening surfaces for constituting the opening, and the grooves are formed into a V-shaped cross-section.

Preferably, the elastic element has a pair of contact surfaces for making contact with an inner surface of the axle beam when fitted into the axle beam, and a pair of relief grooves positioned proximally to the contact surfaces and on the surface opposing the opening, and the relief grooves are formed so as to be capable of elastically deforming in a direction of absorbing error in the fitting dimensions of the contact surfaces with respect to the inner surface of the axle beam.

Desirably, when the fitting hole is fitted over the stabilizer bar, at least a portion of the elastic element in an area where contact is made with the substantially U-shaped inner surface of the axle beam is formed as an irregular surface.

Advantageous Effects of Invention

In the present invention, when the opening engages with the stabilizer bar, the pair of second projections is the first to come into contact with the stabilizer bar. This causes elastic deformation which opens the opening on the open end side approximately halfway. Afterwards, the pair of first projections come into contact with the stabilizer bar. This causes elastic deformation which opens the opening on the fitting hole side approximately halfway. Because the opening can be opened in two stages, the force used to open the opening (i.e., the force occurring when the opening engages with the stabilizer bar) is unexpectedly small. As a result, the bush for isolating the stabilizer from vibration can be fitted onto the stabilizer bar using a small amount of force. Also, an improvement is realized in regard to the bush for isolating the stabilizer from vibration being attached to the axle beam and the stabilizer bar.

When the fitting hole has been fitted over the stabilizer bar, the elastic element comes into contact with the substantially U-shaped inner surface of the axle beam and is elastically deformed in the direction closing the opening. This elastic deformation causes the pair of second projections to make contact with the pair of first projections. As a result, the pair of first projections adjacent to the fitting hole and the pair of second projections adjacent to the open end of the opening come into contact with each other when the fitting hole has been fitted over the stabilizer bar. The pair of first projections and the pair of second projections support each other so that any force acting on the other is stopped. For example, when force occurs in the direction for extracting the fitting hole from the stabilizer bar (extraction force), the extraction force causes elastic deformation which moves the pair of first projections toward the pair of second projections. However, because the pair of first projections is supported by the pair of second projections, the deformation is suppressed. Because the deformation of the pair of first projections is suppressed, it is difficult for the opening to open. This suppresses the bush for isolating the stabilizer from vibration from coming off with respect to the axle beam and the stabilizer bar.

The present invention thus allows the bush for isolating the stabilizer from vibration to fit better on the axle beam and stabilizer bar while also more effectively preventing the bush from coming off with respect to the axle beam and stabilizer bar.

In the present invention, the opening width between the pair of second projections is preferably set greater than the opening width between the pair of first projections. When the dimension from the base end of one second projection to the base end of the other second projection has been predetermined, the height of each one of the second projections can be reduced to the extent that the opening width between the pair of second projections is increased. When the second projections are inclined toward the first projections, it is difficult for second projections of a lower height to come into contact with the first projections even if the angle of inclination is fixed.

As mentioned above, when the opening engages with the stabilizer bar, the pair of second projections are the first to come into contact with the stabilizer bar. This causes elastic deformation which opens the open end of the opening by approximately half. Because the short second projections do not come into contact with the first projections when the second projections first come into contact with the stabilizer bar, the first projections are not affected. The pair of second projections can be sufficiently elastically deformed to open the opening on the open end side approximately halfway. This further improves the fit of the bush for isolating the stabilizer from vibration with respect to the stabilizer bar.

In the present invention, each of the pair of second projections has an inclined surface facing the open end of the opening. Preferably, the pair of inclined surfaces are formed so as to move closer to each other while moving from the open end to the fitting hole. Thus, the pair of inclined surfaces are tapered and become narrower from the open end to the fitting hole. When the opening is first engaged with the stabilizer bar, the pair of tapered surfaces makes contact with the stabilizer bar. At this time, the reaction force from the stabilizer bar sustained by the pair of inclined surfaces is divided into a horizontal force and a vertical force. The horizontal force is the reaction force in the direction of engagement, and the vertical force is the reaction force in the push open direction of the opening. Therefore, when the opening becomes engaged with the stabilizer bar, the vertical force can elastically deform the pair of second projections in the opening direction of the opening. Because the pair of inclined surfaces are pushed open by the vertical force, the fit of the bush for isolating the stabilizer from vibration with respect to the stabilizer bar is further improved.

In the present invention, the pair of first projections and the pair of second projections are preferably provided by the formation of a pair of grooves in a pair of opening surfaces facing each other to constitute the opening, and the pair of grooves have a V-shaped cross-section. The pair of second projections can be elastically deformed with the bottoms of the cross-sectionally V-shaped grooves serving as the pivot points. Because the bottoms of the cross-sectionally V-shaped grooves serve as the pivot points, elastic deformation of the grooves and the second projections is readily achieved. For example, when the fitting hole is fitted over the stabilizer bar, as mentioned earlier, the elastic element comes into contact with the substantially U-shaped inner surface of the axle beam and is elastically deformed in the closing direction of the opening. This closes the pair of grooves. Because the pair of grooves are cross-sectionally V-shaped grooves in this case, they are easily closed using the bottoms as the pivot points, and the closed state can be maintained. As a result, the pair of second projections easily continues to support the pair of first projections. Thus, the bush for isolating the stabilizer from vibration is more effectively suppressed from coming off with respect to the axle beam and the stabilizer bar.

In the present invention, the elastic element preferably has a pair of relief grooves. The pair of relief grooves can be elastically deformed in a direction of absorbing error in the fitting dimensions of the pair of contact surfaces with respect to the inner surface of the axle beam. Thus, any error in the fitting dimensions of the pair of contact surfaces due to variability in the manufacturing precision of the axle beam and the elastic element can be absorbed. For example, when the opening angle of an axle beam having a substantially U-shaped cross-section is narrow, elastic deformation of the pair of inclined surfaces towards each other facilitates fitting with the axle beam. Also, one type of elastic element (bush for isolating a stabilizer from vibration) can be prepared for axle beams having variability in their opening angles. This can improve the versatility of the bush for isolating a stabilizer from vibration.

In the present invention, an irregular surface is preferably formed in at least a portion in an area of the elastic element making contact with the substantially U-shaped inner surface of the axle beam when the fitting hole has been fitted over the stabilizer bar. Because the surface is irregular, the surface area making contact with the substantially U-shaped inner surface of the axle beam is small. This improves the fit of the bush for isolating the stabilizer from vibration with respect to the axle beam and the stabilizer bar.]

DESCRIPTION OF EMBODIMENTS

The following is a description of the mode for carrying out the present invention, made with reference to the appended drawings.

(First Embodiment)

Figure 1:
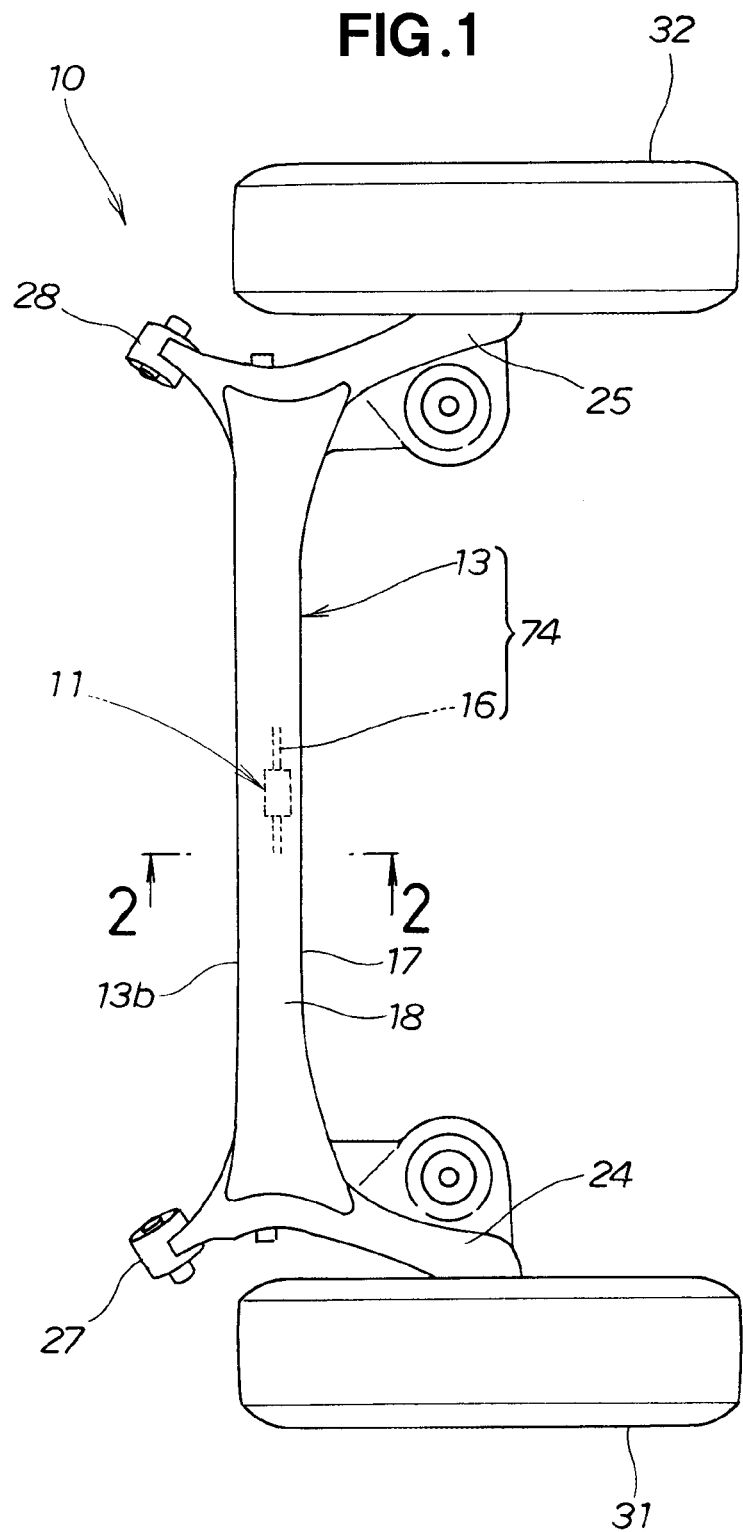
FIG. 1 is a top plan view showing a vehicle suspension having a bush, according to a first embodiment of the present invention, for isolating a stabilizer from vibration.

The following is a description made of a vehicle suspension using the anti-vibration bush in the first embodiment, with reference to FIG. 1 through FIG. 8. As shown in FIG. 1, a vehicle suspension 10 has a bush for isolating a stabilizer from vibration 11, is positioned in the rear portion of the vehicle, and suspends the wheels 31, The suspension 10 includes an axle beam 13 (beam component 13) which is long and narrow in the width direction of the vehicle, left and right arms 24, 25 extending to the front and to the rear from both the left and right ends of the axle beam 13, left and right link portions 27, 28 provided on the front ends of the left and right arms 24, 25, and a stabilizer bar 16 bridging both ends of the left and right arms 24, 25. The left and right wheels 31, 32 are rotatably supported at the rear ends of the left and right arms 24, 25.

This suspension 10 is a so-called axle beam suspension in which the wheels 31, 32 are attached to both ends of the axle beam 13, and a suspension bar 16 bridges both ends of the axle beam 13.

Figure 2:
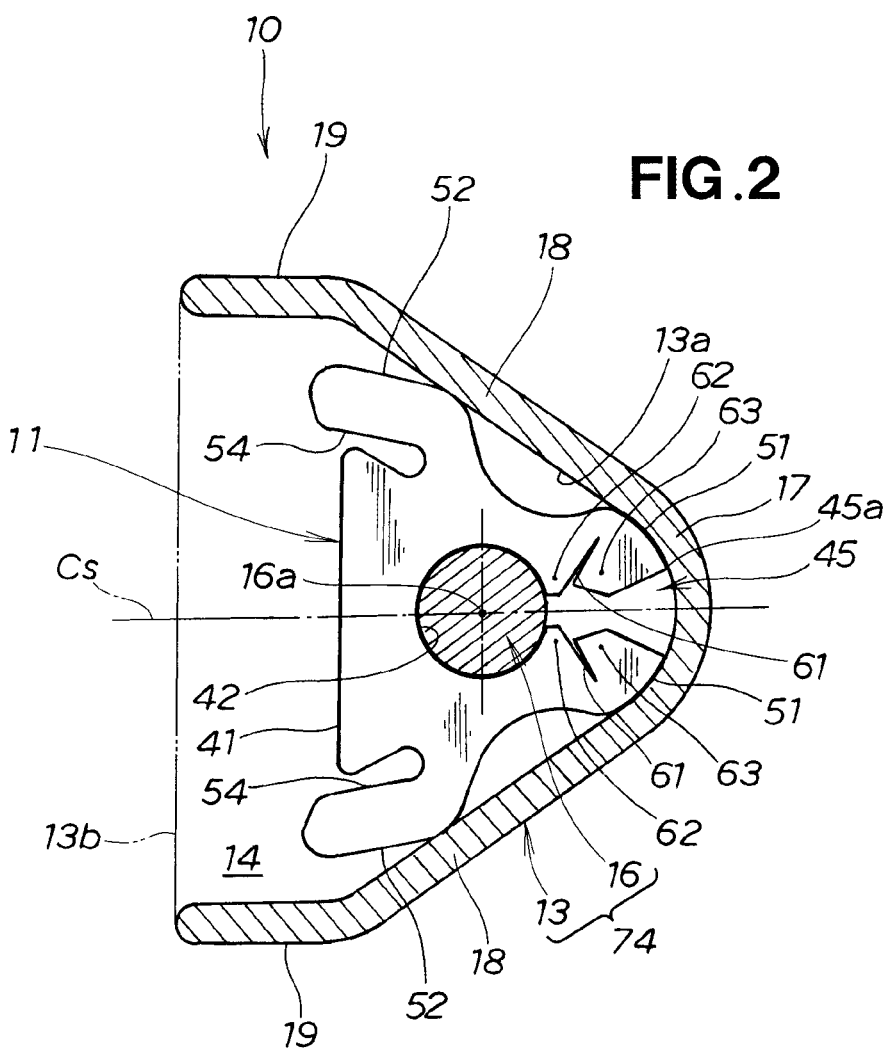
FIG. 2 is a cross-sectional view taken along line 2-2 of FIG. 1.
Figure 3:
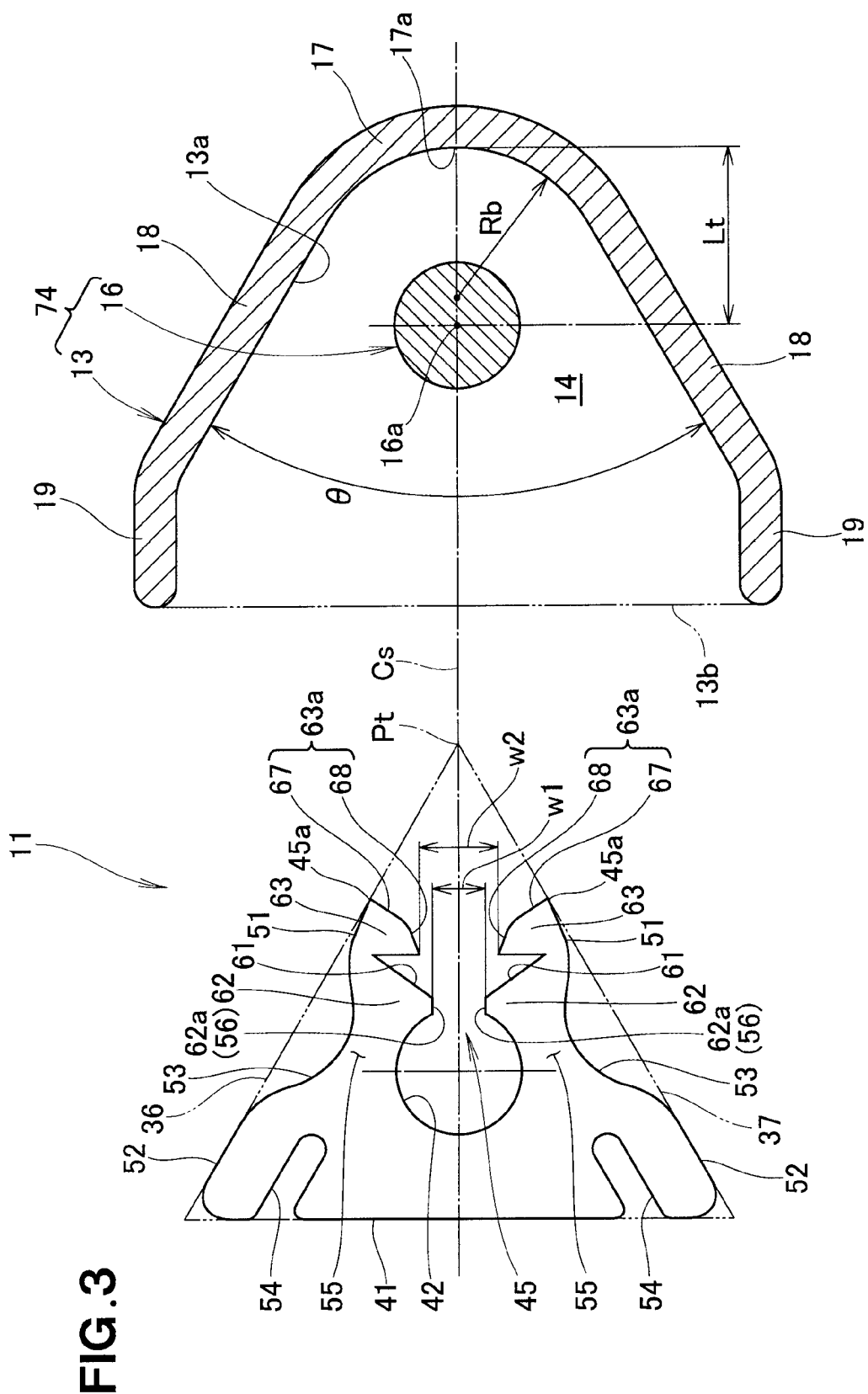
FIG. 3 is an exploded view showing an axle beam, a stabilizer bar and the stabilizer-vibration-isolation bush of FIG. 2.

When viewed from the width direction of the vehicle, as shown in FIG. 2 and FIG. 3, the axle beam 13 has a nearly sideways U-shaped cross-section open on the front end or rear end. More specifically, the axle beam 13 is an integrated molded article made of an arcuate (crescent-shaped) base end 17, a pair of upper and lower inclined plates 18, 18 connected to the upper and lower ends of the arc of the base end 17, and a pair of upper and lower horizontal plates 19, 19 connected to the distal ends of the pair of inclined plates 18, 18.

As shown in FIG. 3, the radius of the inside of the base end 17 is Rb. The pair of upper and lower inclined plates 18, 18 are positioned on a tangent of the arc of the base end 17. The pair of upper and lower inclined plates 18, 18 are formed so as to separate from each other as they move away from the upper and lower ends of the arc. The angle θ of the tapering in the pair of inclined plates 18, 18 (tapering angle θ) is set as an acute angle, and is preferably set as approximately 60°. The tapering angle θ is the inner angle θ of the axle beam 13 or the tapering angle θ of the inner surface 13a of the axle beam 13. The range between the distal ends of the pair of horizontal plates 19, 19 is open. As a result, the end 13b of the axle beam 13 opposite the base end 17 is open. The opened end 13b is referred to as open end 13b below.

As shown in FIG. 3, the stabilizer bar 16 is composed of a round, bar-shaped torsion bar. It is positioned in the inner portion 14 (inner space 14) of the axle beam 13 and extends along the axle beam 13 in the width direction of the vehicle. More specifically, the stabilizer bar 16 is positioned in the center between the pair of upper and lower inclined plates 18, 18. A horizontal straight line Cs extending in the front and rear directions of the vehicle through the center 16a of the stabilizer bar 16 is referred to below as the axis Cs. The axle beam 13 is formed in a linearly symmetrical shape relative to the axis Cs. The diameter of the stabilizer bar 16 is smaller than the radius Rb of the inside of the base end 17. A distance Lt from the bottom 17a of the base end 17 to the center 16a of the stabilizer bar 16 is greater than the radius Rb of the base end 17. The axle beam 13 combined with the stabilizer bar 16 forms a beam assembly 74.

As shown in FIG. 1 and FIG. 2, at least one anti-vibration bush 11 is fitted partway along the length of the axle beam 13. This bush for isolating a stabilizer from vibration 11 suppresses vibration of the axle beam 13 and vibration of the stabilizer bar 16 while, e.g., the vehicle is traveling or is under braking. Because the anti-vibration bush 11 is fitted over the stabilizer bar 16, it is known as a bush for isolating a stabilizer from vibration. The anti-vibration bush 11 is referred to below as a bush for isolating a stabilizer from vibration 11 (abbreviated: bush 11).

Figure 4:
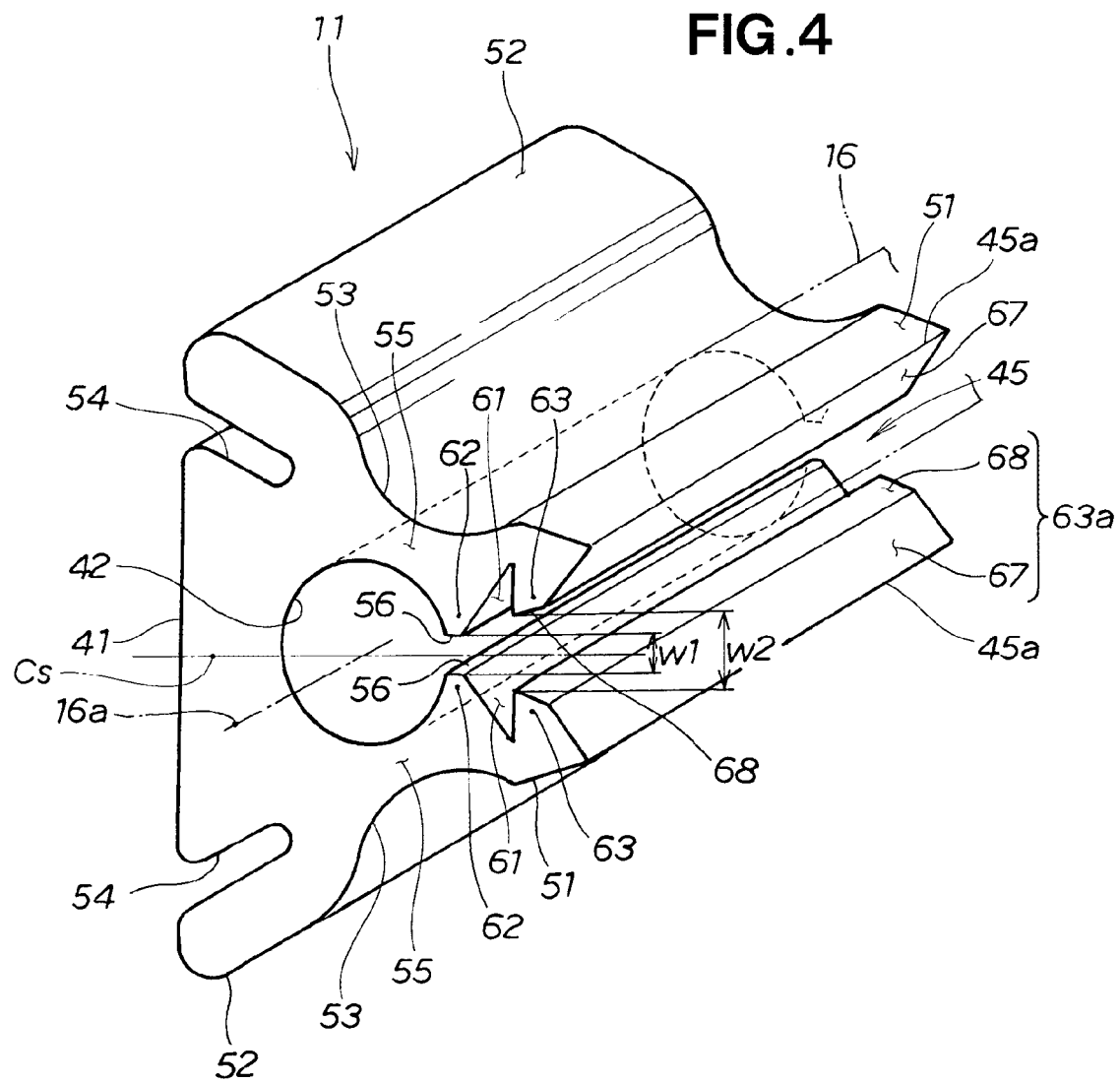
FIG. 4 is a perspective view showing the stabilizer-vibration-isolation bush of FIG. 3.

As shown in FIG. 3 and FIG. 4, the bush 11 is a short, tubular elastic element with a uniform cross-sectional shape. The bush 11 is made out of a material such as rubber. More specifically, the tubular bush 11 has an overall profile that is substantially triangular when the tube is viewed lengthwise. The overall profile of the bush 11 is preferably a linearly symmetrical isosceles triangle relative to the axis Cs. The overall profile is more preferably an equilateral triangle within the frame of dotted lines. The equilateral triangle is linearly symmetrical relative to the axis Cs, and the stabilizer bar 16 is oriented to one vertex Pt positioned on the axis Cs. Because the inner angle θ of the axle beam 13 is set to 60°, a good fit is achieved and the angle is matched if the bush 11 has the shape of an equilateral triangle.

The three sides of a bush 11 whose overall profile is that of an equilateral triangle are composed of a first side 36 and a second side 37 mutually inclined with respect to the axis Cs, and a third side 41 perpendicular to the axis Cs as shown by the dotted lines. The vertex Pt is the point of intersection between the first side 36 and the second side 37. Because the first side 36 is the first lateral surface of the bush 11, it is appropriately referred to as the first lateral surface 36 below. Because the second side 37 is the second lateral surface of the bush 11, it is appropriately referred to as the second lateral surface 37 below. Because the third side 41 is the third lateral surface of the bush 11, it is appropriately referred to as the third lateral surface 41 below.

The bush 11 has a fitting hole 42 positioned in the approximate center of the equilateral triangle, and an opening 45 passing from the fitting hole 42 to the vertex Pt. This opening 45 opens the fitting hole 42 by creating a notch in the bush 11 from the fitting hole 42 to the vertex Pt. In other words, the fitting hole 42 and the opening 45 communicate with each other. Thus, the overall profile of a bush 11 having an opening 45 is that of both a substantially triangular shape and approximately the letter C when viewed lengthwise (in the length direction of the tube).

The fitting hole 42 and the opening 45 are positioned on the axis Cs, and pass through the bush 11 in the lengthwise direction. The fitting hole 42 is a perfectly round hole into which the round, bar-shaped stabilizer bar 16 is fitted. The diameter of the fitting hole 42 is substantially the same as the diameter of the stabilizer bar 16. In other words, the diameter of the fitting hole 42 is set so that the entire inner peripheral surface of the fitting hole 42 makes close contact with the outer peripheral surface of the stabilizer bar 16.

The opening 45 is an opening used for engaging the stabilizer bar 16 guidance into the fitting hole 42. The opening 45 is formed in a shape which is linearly symmetrical with respect to the axis Cs. The overall profile of the opening 45 is substantially tapered, widening from the fitting hole 42 outward towards the vertex Pt. The minimum opening width w1 of the opening 45 is smaller than the diameter of the fitting hole 42.

Figure 5:
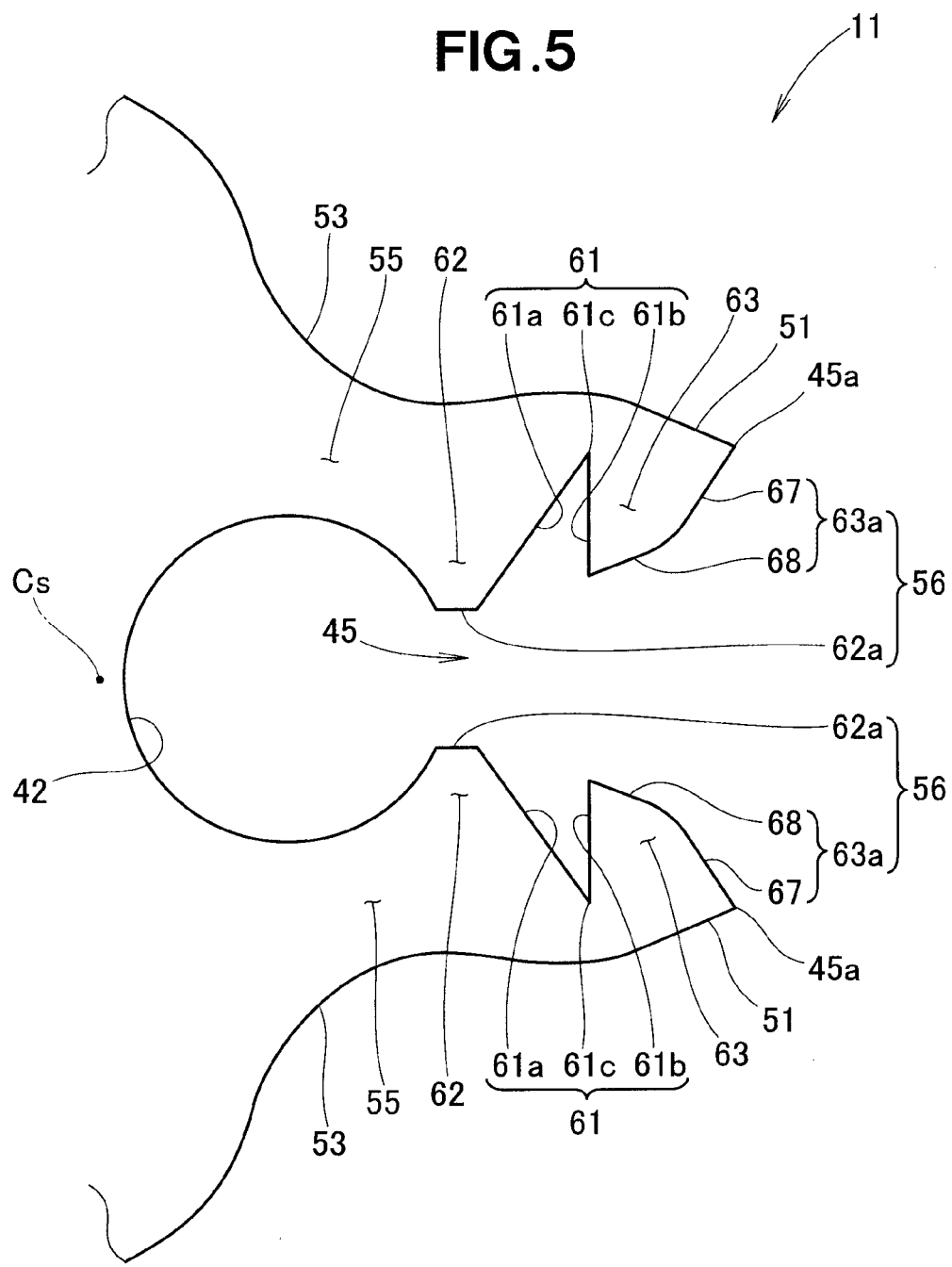
FIG. 5 is a view showing on an enlarged scale an opening in the stabilizer-vibration-isolation bush of FIG. 3.

As shown in FIG. 5, notches 61, 61 are formed in a pair of upper and lower opening surfaces 56, 56 which face each other to form the opening 45. The pair of notches 61, 61 are grooves having a bottom which are positioned so as to face each other. They have a V-shaped cross-section. In other words, a pair of inclined surfaces 61a, 61b form the V-shaped notch 61. The opening angle of the pair of notches 61, 61 can be either an acute angle or an obtuse angle, but an acute angle is preferred. The pair of notches 61, 61 pass through the bush 11 in the lengthwise direction. In other words, the pair of notches 61, 61 are formed along the direction of the fitting hole 42. This pair of notches 61, 61 are appropriately referred to as grooves 61, 61 below.

In each opening surface 56, 56, the range from the fitting hole 42 to the open end 45a of the opening 45 is divided by the pair of notches 61, 61 (grooves 61, 61). As a result, the opening surfaces 56, 56 are separated by the pair of notches 61, 61 into a pair of first opening surfaces 62a, 62a, and a pair of second opening surfaces 63a, 63a. In other words, the opening surfaces 56, 56 are divided in two lengthwise from the fitting hole 42 to the open end 45a of the opening 45 by the notches 61, 61. The pair of first opening surfaces 62a, 62a are positioned adjacent to the fitting hole 42 and face each other. The pair of second opening surfaces 63a, 63a are positioned adjacent to the open end 45a of the opening 45 and face each other.

The pair of second opening surfaces 63a, 63a and the pair of first opening surfaces 62a, 62a are formed so as to make sequential and individual contact with the stabilizer bar 16 and so as to be elastically deformable in the opening direction of the opening 45 individually when the opening 45 has engaged with the stabilizer bar 16.

The following is a description of the first opening surface 62a. By having a notch 61 formed in the first opening surface 56, the notch 61 in the first opening surface 56 forms a first portion 62 close to the fitting hole 42, and a second portion 63 close to the open end 45a of the opening 45. In other words, the first and second portions 62, 63 may be regarded as portions which protrude from a bottom 61c of the notch 61 toward the axis Cs as far as the first opening surface 56. The first portion 62 is referred to as the first projection 62, and the second portion 63 is referred to as the second projection 63 below. Because the second opening surfaces 63a, 63a are similar to the first opening surfaces 62a, 62a, further description has been omitted.

Thus, a pair of first projections 62, 62 having first opening surfaces 62a, 62a, and a pair of second projections 63, 63 having second opening surfaces 63a, 63a are formed in the opening 45. The thickness of the first projections 62, 62 and the second projections 63, 63 is approximately half the overall thickness of from the fitting hole 42 to an open end 15a of the opening 45 in the lengthwise direction of the opening.

The pair of first projections 62, 62 are positioned adjacent to the fitting hole 42 and face each other. The pair of second projections 63, 63 are positioned adjacent to the open end 45a of the opening 45 and face each other. Thus, the opening 45 has a pair of first projections 62, 62, and a pair of second projections 63, 63 in the range from the fitting hole 42 to the open end 45a of the opening 45.

The pair of second projections 63, 63 and the pair of first projections 62, 62 are formed so as to make sequential and individual contact with the stabilizer bar 16 and so as to be elastically deformable in the opening direction of the opening 45 individually when the opening 45 has engaged with the stabilizer bar 16.

The first opening surfaces 62a, 62a can be parallel to the axis Cs. The opening width between the pair of upper and lower first projections 62, 62 is w1, which is the same as the minimum opening width of the opening 45. The opening width w2 of the pair of upper and lower second projections 63, 63 is greater than the opening width w1 between the pair of upper and lower first projections 62, 62. Here, the opening width w2 is the dimension separating the upper and lower second projections 63, 63 from each other at their closest point.

The pair of second opening surfaces 63a, 63a are formed as inclined surfaces facing the open end 45a of the opening 45. The second opening surfaces 63a, 63a are inclined so as to come closer to each other as they move from the open end 45a toward the fitting hole 42.

More specifically, the pair of second opening surfaces 63a, 63a are inclined in two stages with respect to the axis Cs. The second opening surfaces 63a, 63a are composed of first inclined surfaces 67, 67, and second inclined surfaces 68, 68 connected to the ends of the first inclined surfaces 67, 67. The first inclined surfaces 67, 67 are inclined from the open end 45a of the opening 45 toward the fitting hole 42. The second inclined surfaces 68, 68 are inclined from the ends of the first inclined surfaces 67 toward the fitting hole 42.

Thus, each of the pair of second projections 63, 63 has inclined surfaces 67, 67, 68, 68 facing the open end 45a of the opening 45. The pair of first inclined surfaces 67, 67 are inclined so as to come closer to each other as they move from the open end 45a toward the fitting hole 42. Similarly, the pair of second inclined surfaces 68, 68 are inclined so as to come closer to each other as they move from the open end 45a toward the fitting hole 42.

The angle of inclination of the first inclined surface 67 with respect to the axis Cs is greater than the angle of inclination of the second inclined surface 68 with respect to the axis Cs. The pair of upper and lower first inclined surfaces 67, 67 and the pair of upper and lower second inclined surfaces 68, 68 are tapered and become narrower from the open end 45a of the opening 45 toward the fitting hole 42. The tapering angle of the taper in the upper and lower first inclined surfaces 67, 67 is greater than the tapering angle of the taper in the upper and lower second inclined surfaces 68, 68.

As shown in FIG. 3, the bush 11 has a pair of first contact surfaces 51, 51, a pair of second contact surfaces 52, 52, a pair of recesses 53, 53, and a pair of relief grooves 54, 54 (outer grooved portions 54, 54).

The pair of first contact surfaces 51, 51 and the pair of second contact surfaces 52, 52 make contact with the inner surface 13a of the axle beam 13 when the bush 11 is fitted with respect to the axle beam 13. One set of first and second contact surfaces 47, 48 are formed along the first lateral surface 36. The other set of first and second contact surfaces 47, 48 are formed along the second lateral surface 37. The pair of first contact surfaces 51, 51 are positioned adjacent to the open end 45a of the opening 45. The pair of second contact surfaces 52, 52 are positioned adjacent to the third lateral surface 41.

The pair of recesses 53, 53 are portions that arcuately recede into the bush 11 from the first and second lateral surfaces 36, 37. These are positioned between the pair of first contact surfaces 51, 51 and the pair of second contact surfaces 52, 52. The pair of recesses 53, 53 pass through the bush 11 in the lengthwise direction. Thus, the thickness of the bush 11 in the portions 55, 55 (constricted portions 55, 55) between the fitting hole 42 and the pair of recesses 53, 53 is smaller than the other portions. The pair of first projections 62, 62 can be elastically deformed in the opening and closing directions of the opening 45 using the pair of constricted portions 55, 55 as the pivot points.

The pair of relief grooves 54, 54 are formed to enable elastic deformation in a direction which absorbs the error in the fitting dimensions of the pair of second contact surfaces 52, 52 with respect to the inner surface 13a of the axle beam 13. More specifically, the pair of relief grooves 54, 54 are positioned adjacent to the pair of second contact surfaces 52, 52 and on the third lateral surface 41 (the surface 41 opposite the opening 45). Also, the pair of relief grooves 54, 54 are grooves having a bottom which open on the third lateral surface 41 and are oriented from the third lateral surface 41 toward the opening 45. They are substantially parallel to the pair of second contact surfaces 52, 52. Also, the pair of relief grooves 54, 54 are formed with mutual linear symmetry with respect to the axis Cs, and pass through the bush 11 in the lengthwise direction (see FIG. 4).

The pair of relief grooves 54, 54 are able to absorb any error in the fitting dimensions of the pair of second contact surfaces 52, 52 due to variability in the manufacturing precision of the axle beam 13 and the bush 11. For example, when the opening angle θ of the axle beam 13 having a substantially U-shaped cross-section is narrow, the bush can be easily fitted in the axle beam 13 by being elastically deformed in a direction which brings the pair of second contact surfaces 52, 52 closer to each other. Also, one type of bush 11 can be prepared for axle beams 13 having variability in opening angles θ. This improves the versatility of the bush 11.

However, as shown in FIG. 3 and FIG. 5, the pair of second projections 63, 63 can be elastically deformed in the opening and closing directions of the opening 45 using the bottom 61c, 61c of the pair of notches 61 as the pivot point. Thus, when the pair of first contact surfaces 51, 51 are pushed toward the axis Cs, the pair of second projections 63, 63 pivot on the bottom 61c, 61c of the notches 61 and are elastically deformed so as to close the opening 45. As a result, the pair of notches 61, 61 close. Afterwards, when the force pushing on the pair of first contact surfaces 51, 51 is released, the pair of second projections 63, 63 automatically return to their original state due to their own resilience. As a result, the pair of notches 61, 61 open again. In this way, the pair of notches 61, 61 can be opened and closed.

Because the bottom 61c, 61c of the notches 61, 61 having a V-shaped cross-section serves as the pivot points, elastic deformation of the notches 61 and the second projections 63, 63 is readily achieved. For example, as described above, when the fitting hole 42 is fitted over the stabilizer bar 16, the bush 11 comes into contact with the substantially U-shaped inner surface 13a of the axle beam 13 and is elastically deformed in the direction closing the opening 45. This closes the pair of notches 61, 61. Because the pair of notches 61, 61 are grooves having a V-shaped cross-section in this case, they are readily closed with the bottom 61c, 61c serving as the pivot points, and the closed state can be maintained. It is therefore easy for the pair of second projections 63, 63 to continuously support the pair of first projections 62, 62. In this way, it is possible to suppress, in a more reliable manner, any incidence of the bush 11 coming off relative to the axle beam 13 and stabilizer bar 16. The pair of notches 61, 61 are referred to below as grooves 61 where appropriate.

The following is a description of the procedure for mounting a bush 11 having this configuration on the beam assembly 74. First, as shown by arrow a1 in FIG. 6A, the bush 11 is introduced from the open end 13b of the axle beam 13 toward the stabilizer bar 16.

Next, the position of the opening 45 of the bush 11 is harmonized with the stabilizer bar 16. As mentioned above, the tapering angle of the tapering formed by the upper and lower first inclined surfaces 67, 67 is large. As a result, it is easy to position the opening 45 with respect to the stabilizer bar 16.

Figure 7:
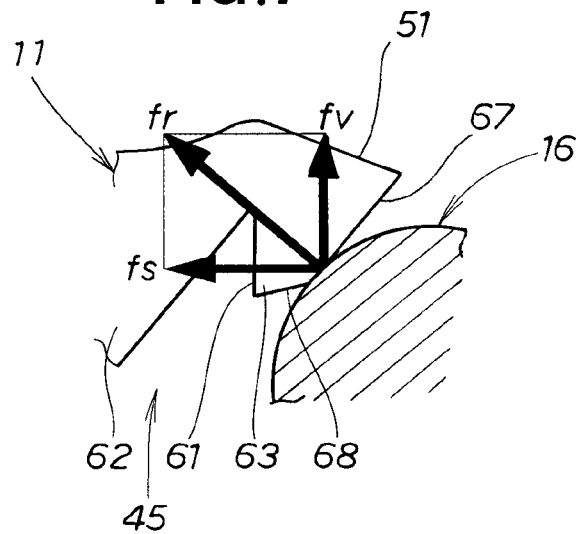
FIG. 7 is an enlarged view showing component 7 of FIG. 6A.

Next, when the bush 11 is pushed in and the opening 45 starts to become engaged with the stabilizer bar 16, the first inclined surfaces 67, 67, each having the second projections 63, 63, make contact with and ride over the outer peripheral surface of the stabilizer bar 16. At this time, as shown in FIG. 7, the reaction force fr sustained by the first inclined surface 67 from the stabilizer bar 16 is divided into a horizontal force fs and a vertical force fv. The horizontal force fs is the reaction force in the direction of engagement, and the vertical force fv is the reaction force in the direction which pushes open the opening 45. Thus, when the opening 45 engaged with the stabilizer bar 16, the second projections 63 can elastically deform under the vertical force fv in the opening direction of the opening 45. Because the first inclined surface 67 is pushed open by the vertical force fv, the bush 11 is attached more securely on the stabilizer bar 16. Because the action of the second inclined surfaces 68 described below is similar, the fitting operation is even easier.

Figure 6A:
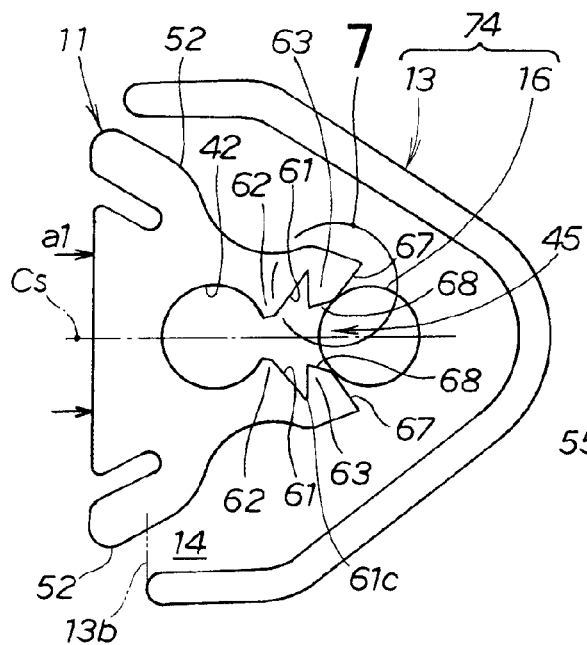
FIGS. 6A-6D illustrate a procedure for mounting the stabilizer-vibration-isolating bush of FIG. 3.

Thus, as shown in FIG. 6A, the first inclined surfaces 67, 67, each of which having a second projection 63, 63, make contact with and ride over the outer peripheral surface of the stabilizer bar 16, and are thereby pushed open by the outer peripheral surface. In other words, the second projections 63, 63 elastically deform with the bottom 61c, 61c of the notches 61, 61 serving as the pivot points so as to open the opening 45. The notches 61, 61 (grooves 61, 61) are opened in response to the deformation of the second projections 63, 63 in the opening direction.

Figure 6B:
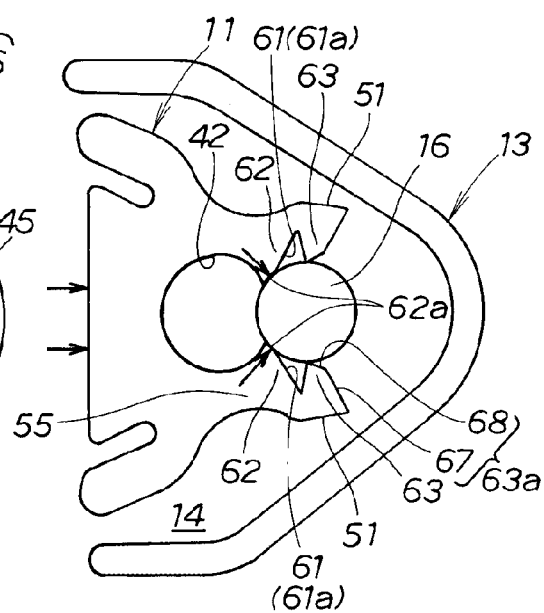

When the bush 11 is pushed in even further, as shown in FIG. 6B, the second inclined surfaces 68, 68 of the second projections 63, 63 are then pushed open by the outer peripheral surface of the stabilizer bar 16. In other words, the second projections 63, 63 elastically deform to further open the opening 45. As described above, the tapering angle of the tapering formed by the upper and lower second inclined surfaces 68, 68 is smaller than the tapering angle of the tapering formed by the upper and lower first inclined surfaces 67, 67. Because the tapering angle is small, the upper and lower second projections 63, 63 can be easily pushed open.

Thus, only the second projections 63, 63 are opened in the initial stage of the push-in operation. The first projections 62, 62 taking up approximately half of the length of the opening 45 remain in the state prior to being introduced onto the stabilizer bar 16. In other words, the force used to push in the bush 11 is an unexpectedly small force that elastically deforms and opens only the second projections 63, 63.

As shown in FIG. 6B, when the distal ends of the second projections 63, 63 (second opening surfaces 63a, 63a) have ridden over the outer peripheral surface of the stabilizer bar 16, the second projections 63, 63 open no further. When the bush 11 is pushed in even further, the inclined surfaces of the upper and lower first projections 62, 62 (the inclined surfaces 61a, 61a of the notches 61, 61) come into contact with and ride over the outer peripheral surface of the stabilizer bar 16, pushing them open. As a result, the first projections 62, 62 elastically deform with the constricted portions 55, 55 serving as the pivot points, which opens the opening 45.

Afterwards, when the bush 11 is pushed in even further, the distal ends of the upper and lower first projections 62, 62 (the first opening surfaces 62a, 62a) come into contact with and ride over the outer peripheral surface of the stabilizer bar 16.

They are thus pushed open by the outer peripheral surface. In other words, the first projections 62, 62 elastically deform so as to open the opening 45 even further. Thus, only the first projections 62, 62 are opened in the latter stage of the push-in operation. The second projections 63, 63 composing approximately half of the length of the opening 45 do not have to deform. In other words, the force used to push in the bush 11 is an unexpectedly small force that elastically deforms and opens only the first projections 62, 62.

Figure 6C:
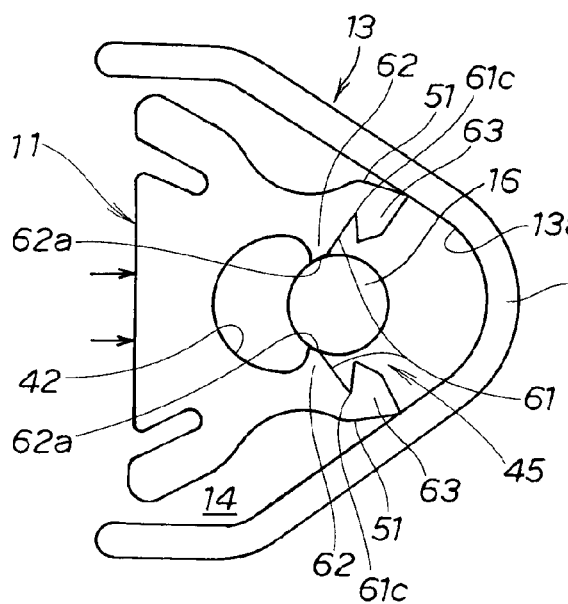

While the first projections 62, 62 are being pushed open by the outer peripheral surface of the stabilizer bar 16, the first contact surfaces 51, 51 come into contact with the inner surface 13*a* of the axle beam 13 as shown in FIG. 6C. Accordingly, the first contact surfaces 51, 51 are directed by the tapered inner surface 13*a* in the closing direction (the direction approaching the axis Cs). As a result, the second projections 63, 63 elastically deform using the bottom 61*c*, 61*c* of the notches 61, 61 as the pivot points to close the opening 45. At this time, the notches 61, 61 are closed in response to the deforming of the second projections 63, 63 in the closing direction. Thus, the second projections 63, 63 deformed in the closing direction are not affected by the opening action of the first projections 62, 62.

Figure 6D:
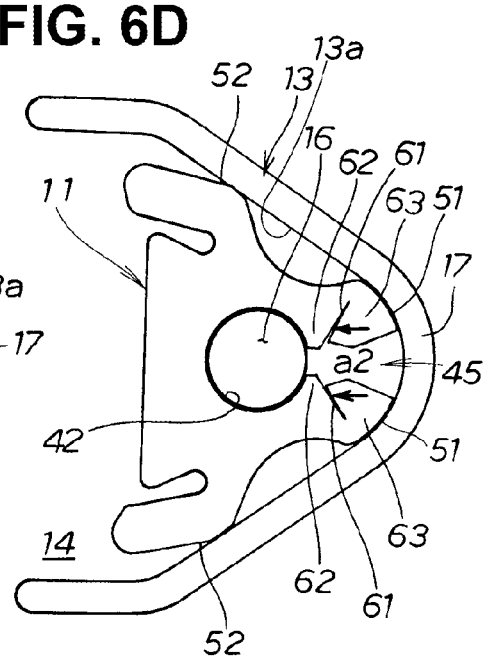

Afterwards, when the bush 11 is pushed in even further, the distal ends of the first projections 62, 62 (the first opening surfaces 62*a*, 62*a*) ride over the outer peripheral surface of the stabilizer bar 16. With this, as shown in FIG. 6D, the first projections 62, 62 return to their original state due to their own resilience. The fitting hole 42 is thus fitted over the stabilizer bar 16.

In this state, the first contact surfaces 51, 51 are guided in the closing direction (the direction approaching the axis Cs) by the base ends 17 of the closed arc of the axle beam 13. As a result, the second projections 63, 63 under prominent elastic deformation using the bottom 61*c*, 61*c* of the notches 61, 61 as the pivot points to close the opening 45. At this time, the notches 61, 61 are closed in response to the deforming of the second projections 63, 63 in the closing direction. As a result, the second projections 63, 63 come into contact with the first projections 62, 62 and are pressed as indicated by arrow a2. The task of mounting of the bush 11 on the axle beam 13 and the stabilizer bar 16 is then complete.

Thus, when the opening 45 engages with the stabilizer bar 16, at first only the pair of second projections 63, 63 (corresponding to the second opening surfaces 63*a*, 63*a*) come into contact with the stabilizer bar 16, which elastically deforms them so as to open the opening 45 on the open end 45*a* side approximately halfway. Afterwards, the pair of first projections 62, 62 (corresponding to the first opening surfaces 62*a*, 62*a*) come into contact with the stabilizer bar 16, which elastically deforms them so as to open the opening 45 on the fitting hole 42 side approximately halfway. In other words, because the thin first projections 62, 62 and second projections 63, 63 elastically deform separately, the deforming force is unexpectedly small. Because the opening 45 can be opened in two stages, the force opening the opening 45, i.e., the force when the opening 45 engages with the stabilizer bar 16, is also smaller than expected. As a result, the bush 11 can be fitted over the stabilizer bar 16 using a small force. The fit of the bush 11 with respect to the axle beam 13 and the stabilizer bar 16 is also improved.

However, as mentioned above, the opening width w2 between the pair of second projections 63, 63 is set so as to be larger than the opening width w1 between the pair of first projections 62, 62. When the dimension from the base end of one second projection 63 to the base end of the other second projection 63 has been predetermined, the height of each one of the second projections 63, 63 can be reduced to the extent that the opening width w2 between the pair of second projections 63, 63 is increased. When the second projections 63, 63 are inclined toward the first projections 62, 62, it is difficult for the second projections 63, 63 of a lower height to come into contact with the first projections 62, 62 even if the angle of inclination is fixed.

As mentioned above, when the opening 45 engages with the stabilizer bar 16, the pair of second projections 63, 63 are the first to come into contact with the stabilizer bar 16. This causes elastic deformation which opens the opening 45 on the open end 45*a* side approximately halfway. Because the short pair of second projections 63, 63 do not come into contact with the first projections 62, 62 when the pair of second projections 63, 63 are the first to come into contact with the stabilizer bar 16, the first projections 62, 62 are not affected. The pair of second projections 63, 63 can be elastically deformed sufficiently to open the opening 45 on the open end 45*a* side approximately halfway. This further improves the fit of the bush 11 with respect to the stabilizer bar 16.

The outer peripheral surface of the fitted bush 11 makes contact with the inner surface 13*a* of the axle beam 13 in a compressed state. Vibration of the axle beam 13 and the stabilizer bar 16 is suppressed by the anti-vibration bush 11.

The following is a description of the force applied to remove the bush 11 from the beam assembly 74. When the fitting hole 42 has been fitted over the stabilizer bar 16 as shown in FIG. 6D, the bush 11 comes into contact with the substantially U-shaped inner surface 13*a* of the axle beam 13 and elastically deforms in the direction closing the opening 45. This causes elastic deformation which causes the pair of second projections 63, 63 to come into contact with the pair of first projections 62, 62. In other words, the pair of notches 61, 61 (grooves 61, 61) are closed. As a result, when the fitting hole 42 has been fitted over the stabilizer bar 16, the pair of first projections 62, 62 adjacent to the fitting hole 42 and the pair of second projections 63, 63 adjacent to the open end 45*a* of the opening 45 come into contact with each other. In other words, the inclined surfaces 61*a*, 61*a* and the other inclined surfaces 61*b*, 61*b* corresponding to the pair of notches 61, 61 come into contact with each other as shown in FIG. 5. In the state shown in FIG. 6D, the elastic deformation of the pair of second projections 63, 63 in the opening direction is restrained by the inner surface 13*a* of the axle beam 13. As a result, the pair of first projections 62, 62 and the pair of second projections 63, 63 support each other so as to stop the forces acting on each other.

Figure 8:
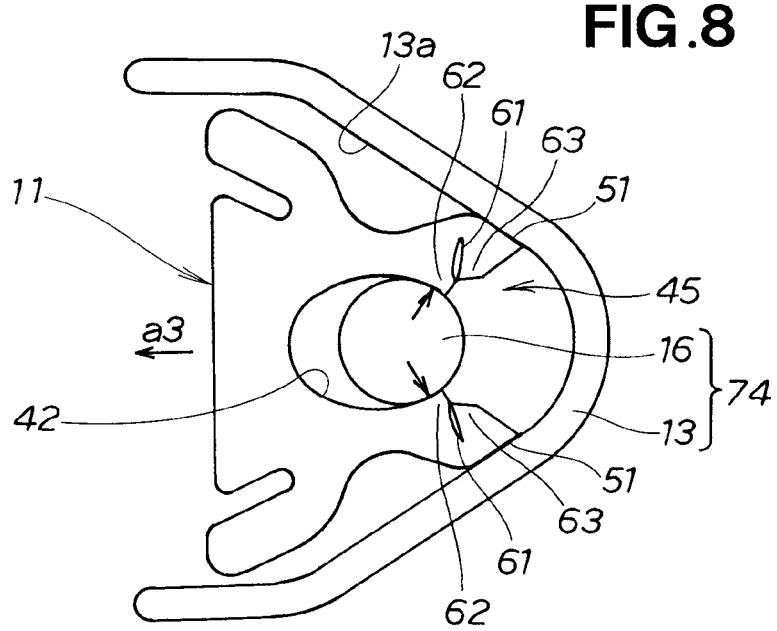
FIG. 8 is a view illustrating an action preventing the stabilizer-vibration-isolating bush from coming off the axle beam and the stabilizer bar of FIG. 2.

Afterwards, when a force in the direction of extraction of the fitting hole 42 from the stabilizer bar 16 (extraction force) has been generated as indicated by arrow a3 shown in FIG. 8, the movement of the first projections 62, 62 in the extraction direction is restrained by the stabilizer bar 16. Thus, the pair of first projections 62, 62 elastically deform toward the pair of second projections 63, 63 under the extraction force. However, because the pair of first projections 62, 62 are supported by the pair of second projections 63, 63, the deformation is suppressed. Because the deformation of the pair of first projections 62, 62 is suppressed, the opening 45 is difficult to open. As a result, the fitting hole 42 does not come away from the stabilizer bar 16. It is therefore possible to suppress any incidence of the bush 11 coming off with respect to the axle beam 13 and stabilizer bar 16. Also, neither a bonding agent nor a separate fixing component need to be used to suppress the bush 11 from coming off with respect to the axle beam 13 and the stabilizer bar 16.

(Second Embodiment)

Figure 9:
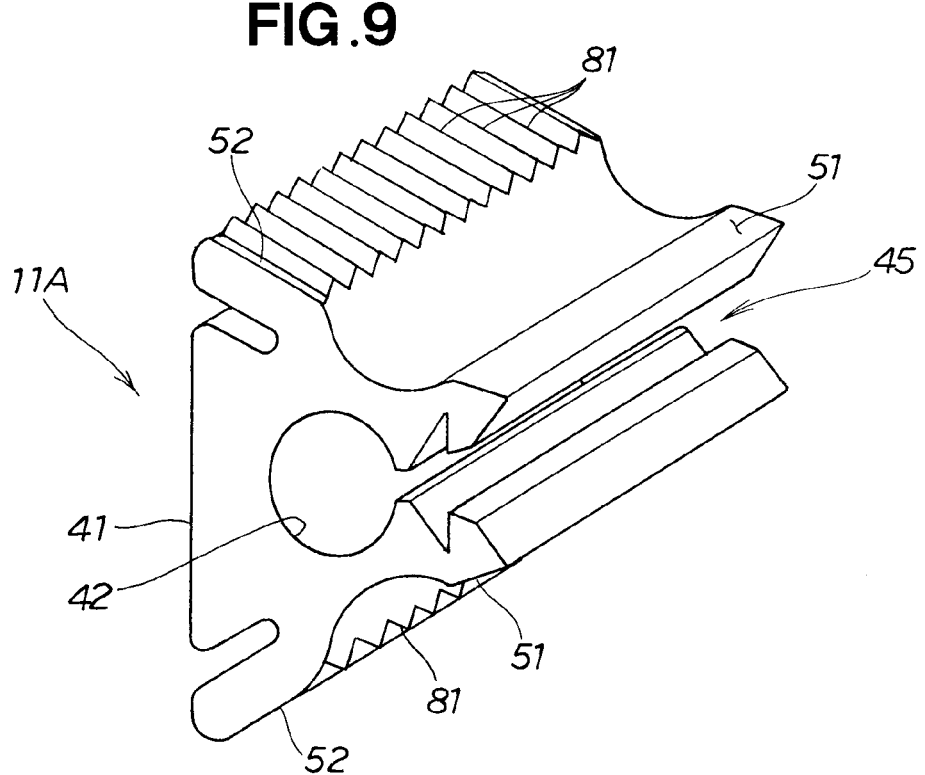
FIG. 9 is a perspective view illustrating a bush for isolating a stabilizer from vibration, according to a second embodiment of the present invention.

The following is a description of a bush for isolating a stabilizer from vibration 11A of a second embodiment, made with reference to FIG. 9. The bush for isolating a stabilizer from vibration 11A of the second embodiment is characterized by the formation of projections and recesses 81 on the pair of second contact surfaces 52, 52. The undulating projections and recesses 81 are arranged at a fixed pitch in the length direction of the bush for isolating a stabilizer from vibration 11A. Because the rest of the configuration is similar to the configuration of the first embodiment shown in FIG. 1 through FIG. 7, further description has been omitted.

(Third Embodiment)

Figure 10:
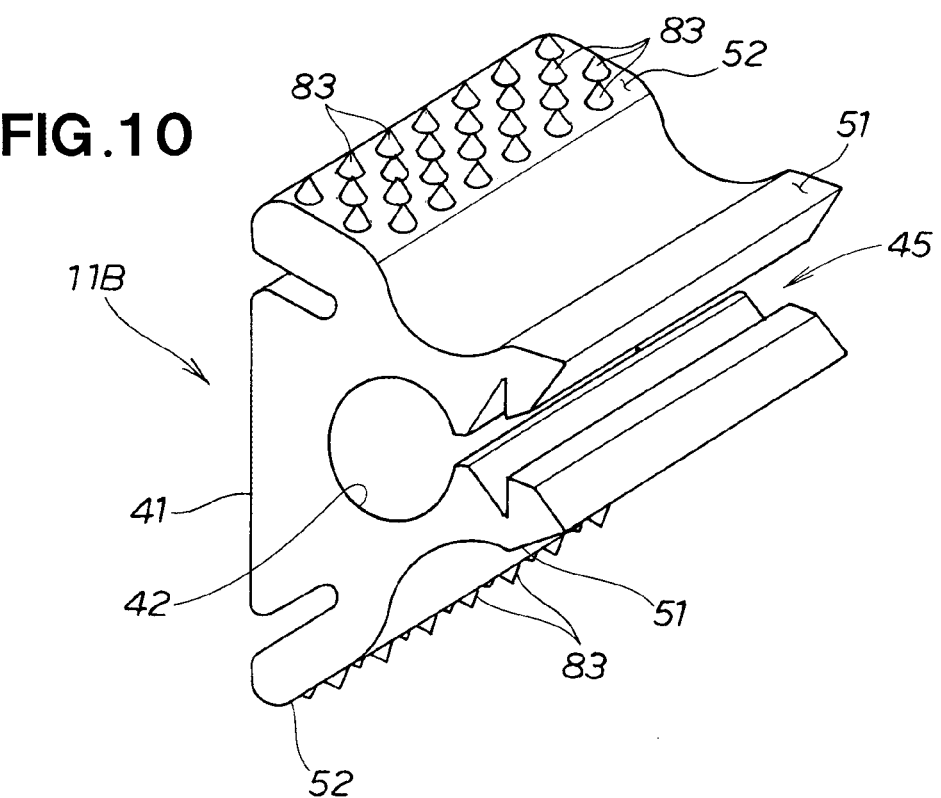
FIG. 10 is a perspective view illustrating a bush for isolating a stabilizer from vibration, according to a third embodiment of the present invention.

The following is a description of a bush for isolating a stabilizer from vibration 11B in the third embodiment, made with reference to FIG. 10. The bush for isolating a stabilizer from vibration 11B in the third embodiment is characterized by the formation of a plurality of small projections 82 on the pair of second contact surfaces 52, 52. The plurality of projections 82 can be conical, and are arranged in a staggered pattern on the pair of second contact surfaces 52, 52. Because the rest of the configuration is similar to the configuration of the first embodiment shown in FIG. 1 through FIG. 7, further explanation has been omitted.

Thus, the bush 11A in the second embodiment and the bush 11B in the third embodiment are characterized by the formation of an irregular surface in at least some (the pair of second contact surfaces 52, 52) of the portion (the pair of first contact surfaces 51, 51 and the pair of second contact surfaces 52, 52) making contact with the substantially U-shaped inner surface 13a of the axle beam 13 when the fitting hole 42 is fitted over the stabilizer bar 16 as shown in FIG. 2.

Because the pair of second contact surfaces 52, 52 are uneven surfaces, the surface area making contact with the substantially U-shaped inner surface 13a of the axle beam 13 is small. This improves the fit of the bush 11 with respect to the axle beam 13 and the stabilizer bar 16. These bushes 11A, 11B also have the same operation and effect as the bush 11 in the first embodiment.

The bush 11, 11A, 11B in the present invention can be used in either a rear suspension or front suspension.

Industrial Applicability

The bush for isolating a stabilizer from vibration 11, 11A, 11B in the present invention is suitable for suppressing the vibration of an axle beam and stabilizer bar in the rear suspension of a vehicle.

List Of Reference Signs
10: Vehicle Suspension
11, 11A, 11B: Bush For Isolating Stabilizer From Vibration (Elastic element)
13: Axle Beam
13a: Inner Surface
13b: Open End
16: Stabilizer Bar
41: Surface Opposing the Opening (3rd Side Surface)
42: Fitting Hole
45: Opening
45a: Open End
51: Contact Surface (1st Contact Surface, Portion Contacting Inner Surface of Axle Beam)
52: Contact Surface (2nd Contact Surface, Portion Contacting Inner Surface of Axle Beam)
54: Relief Groove
56: Opening Surface
61: Groove
62: 1st Projection
62a: 1st Opening Surface
63: 2nd Projection
63a: 2nd Opening Surface
67: Inclined Surface (1st Inclined Surface)
68: Inclined Surface (2nd Inclined Surface)
w1: Opening Width Between 1st Projections
w2: Opening Width Between 2nd Projections

The invention claimed is:

1. A stabilizer-vibration-isolating bush for isolating a stabilizer in a vehicle suspension from vibration, the bush being adapted to be inserted from an open end of an axle beam having a substantially U-shaped cross-section and extending in a vehicle width direction and to be engaged with a stabilizer bar passing through inside the axle beam, wherein the stabilizer-vibration-isolating bush comprises a tubular elastic element which has an opening for engaging with the stabilizer bar and a fitting hole being in communication with the opening and adapted to be fitted over the stabilizer bar, the opening has a pair of first projections and a pair of second projections in a range from the fitting hole to an open end of the opening, the first projections are positioned adjacent to the fitting hole and face each other, and the second projections are positioned adjacent to the open end of the opening and face each other, wherein the pair of first projections and the pair of second projections do not make contact with each other when the opening engages with the stabilizer bar, and the pair of first projections and the pair of second projections are formed so as to make contact with each other in a direction of extraction of the stabilizer bar when there is generated a force in a direction in which the fitting hole is extracted from the stabilizer bar, and wherein the first projections and the second projections are provided by a pair of grooves being formed in a pair of mutually opposing opening surfaces for constituting the opening, and the grooves are formed into a V-shaped cross-section.

2. A stabilizer-vibration-isolating bush for isolating a stabilizer in a vehicle suspension from vibration, the bush being adapted to be inserted from an open end of an axle beam having a substantially U-shaped cross-section and extending in a vehicle width direction and to be engaged with a stabilizer bar passing through inside the axle beam, wherein the stabilizer-vibration-isolating bush comprises a tubular elastic element which has an opening for engaging with the stabilizer bar and a fitting hole being in communication with the opening and adapted to be fitted over the stabilizer bar, the opening has a pair of first projections and a pair of second projections in a range from the fitting hole to an open end of the opening, the first projections are positioned adjacent to the fitting hole and face each other, and the second projections are positioned adjacent to the open end of the opening and face each other, wherein the pair of second projections and the pair of first projections are formed so as to make sequential and individual contact with the stabilizer bar when the opening engages the stabilizer bar, the pair of first projections and the pair of second projections do not make contact with each other when the opening engages with the stabilizer bar, and the pair of first projections and the pair of second projections are formed so as to make contact with each other in a direction of extraction of the stabilizer bar when there is generated a force in a direction in which the fitting hole is extracted from the stabilizer bar, and wherein the pair of second projections and the pair of first projections are further formed so as to be individually capable of elastically deforming in the direction of opening of the opening when the opening engages with the stabilizer bar, and the elastic element is formed so as to make contact with the substantially U-shaped inner surface of the axle beam and elastically deform in the direction of closing of the opening, and thereby be capable of elastically deforming the pair of second projections until the pair of second projections contact the pair of first projections, when the fitting hole has been fitted over the stabilizer bar.

3. A stabilizer-vibration-isolating bush for isolating a stabilizer in a vehicle suspension from vibration, the bush being adapted to be inserted from an open end of an axle beam having a substantially U-shaped cross-section and extending in a vehicle width direction and to be engaged with a stabilizer bar passing through inside the axle beam, wherein the stabilizer-vibration-isolating bush comprises a tubular elastic element which has an opening for engaging with the stabilizer bar and a fitting hole being in communication with the opening and adapted to be fitted over the stabilizer bar, the opening has a pair of first projections and a pair of second projections in a range from the fitting hole to an open end of the opening, the first projections are positioned adjacent to the fitting hole and face each other, and the second projections are positioned adjacent to the open end of the opening and face each other, wherein the pair of first projections and the pair of second projections do not make contact with each other when the opening engages with the stabilizer bar, and the pair of first projections and the pair of second projections are formed so as to make contact with each other in a direction of extraction of the stabilizer bar when there is generated a force in a direction in which the fitting hole is extracted from the stabilizer bar, and wherein the first projections and the second projections are provided by a pair of notches being formed in a pair of mutually opposing opening surfaces for constituting the opening.

4. The stabilizer-vibration-isolating bush according to claim 3, wherein an opening width between the second projections is greater than an opening width between the first projections.

5. The stabilizer-vibration-isolating bush according to claim 3, wherein each of the second projections has an inclined surface facing the open end of the opening, and the inclined surfaces are formed so as to move closer to each other while moving from the open end to the fitting hole.

6. The stabilizer-vibration-isolating bush according to claim 3, wherein the elastic element has a pair of contact surfaces for making contact with an inner surface of the axle beam when fitted into the axle beam, and a pair of relief grooves positioned proximally to the contact surfaces and on the surface opposing the opening, and the relief grooves are formed so as to be capable of elastically deforming in a direction of absorbing error in the fitting dimensions of the contact surfaces with respect to the inner surface of the axle beam.

7. The stabilizer-vibration-isolating bush according to claim 3, wherein when the fitting hole is fitted over the stabilizer bar, at least a portion of the elastic element in an area where contact is made with the substantially U-shaped inner surface of the axle beam is formed as an irregular surface.

* * * * *